United States Patent
Friedland et al.

(10) Patent No.: US 6,374,214 B1
(45) Date of Patent: Apr. 16, 2002

(54) METHOD AND APPARATUS FOR EXCLUDING TEXT PHRASES DURING RE-DICTATION IN A SPEECH RECOGNITION SYSTEM

(75) Inventors: Steven J. Friedland, Boca Raton; Maria E. Smith, Plantation, both of FL (US)

(73) Assignee: International Business Machines Corp., Armonk, NY (US)

( * ) Notice: Subject to any disclaimer, the term of this patent is extended or adjusted under 35 U.S.C. 154(b) by 0 days.

(21) Appl. No.: 09/339,421

(22) Filed: Jun. 24, 1999

(51) Int. Cl.[7] .............................................. G10L 15/26
(52) U.S. Cl. ...................................... 704/235; 704/275
(58) Field of Search ................................ 704/235, 270, 704/272, 275

(56) References Cited

U.S. PATENT DOCUMENTS 5,864,805 A * 1/1999 Chen et al. ................. 704/235
5,899,976 A * 5/1999 Rozak ........................ 704/270
6,064,961 A * 5/2000 Hanson ...................... 704/260
6,138,099 A * 10/2000 Lewis et al. ................ 704/257

* cited by examiner

Primary Examiner—Richemond Dorvil
(74) Attorney, Agent, or Firm—Akerman Senterfitt

(57) ABSTRACT

A method and system for correcting misrecognized phrases in a computer speech recognition system prevents prior misrecognized text phrases from reoccurring during re-dictation. In particular, the present invention provides a method for correcting a user identified misrecognized text at a location in a dictated electronic document. The method includes: receiving dictation from a user; processing the user input to identify a plurality of alternate text selections; excluding the misrecognized text from the plurality of alternate text selections; and replacing it with a replacement text. These steps are repeated each time the user selects and re-dictates text at the location of the misrecognized text.

11 Claims, 4 Drawing Sheets

METHOD AND APPARATUS FOR EXCLUDING TEXT PHRASES DURING RE-DICTATION IN A SPEECH RECOGNITION SYSTEM

BACKGROUND OF THE INVENTION

1. Technical Field

This invention relates to the field of speech recognition computer applications and more specifically to an improved system for excluding or ruling out incorrect phrases when correcting words by re-dictation in a speech recognition system.

2. Description of the Related Art

Speech recognition is the process by which acoustic signals, received via a microphone, are "recognized" and converted into words by a computer. These recognized words may then be used in a variety of computer software applications. For example, speech recognition may be used to input data, prepare documents and control the operation of software applications. Speech recognition systems programmed or trained to the diction and inflection of a single person can successfully recognize the vast majority of words spoken by that person.

When it is to be used by a large number of speakers, however, it is very difficult for the speech recognition system to accurately recognize all of the spoken words because of the wide variety of pronunciations, accents and divergent speech characteristics of each individual speaker. Due to these variations, the speech recognition system may not recognize some of the speech and some words may be converted erroneously. This may result in spoken words being converted into different words ("hold" recognized as "old"), improperly conjoined ("to the" recognized as "tooth"), or recognized as homonyms ("boar" instead "bore").

The erroneous words may also result from the speaker using improper dictation techniques. For example, the speaker may be speaking too rapidly or softly, slurring words or be located too far from the microphone. In this case, the recognition software will likely generate a large number of misrecognized words.

Conventional speech recognition systems often include a means for the user to retroactively rectify these errors following the dictation. To simplify the correction process, a correction interface or "window" may be used to provide a list of suggested or alternate text phrases that in some way resemble the misrecognized phrases. This is accomplished by executing a known algorithm, one much like a spell checking program in word-processing applications, to search a system database for phrases with similar characteristics as the incorrectly recognized text phrase. The algorithm outputs a list of one or more alternates from which the user may select the intended phrase. If the intended phrase is not in the alternate list, the user may type in the words. After the intended phrase is selected or keyed in, the algorithm substitutes the corrected phrase for the erroneous phrase.

Users may short cut the correction process by simply selecting the misrecognized text and re-dictating the intended phrase in its place. For example, assume a user spoke the phrase "tooth", which was subsequently misrecognized by the speech recognition system as "to the". The user can select the text "to the" with a pointing device or keyboard and re-dictate "tooth", which the speech system substitutes for "to the". Commonly, however, the speech recognition system identifies the re-dictated phrase as the misrecognized text (e.g., recognizing the re-dictated "tooth" as "to the"). To the dismay of the user, the original incorrect text may be re-recognized over and over again, requiring the user to input the intended phrase another way.

In one attempt to solve this problem, the selected phrase is removed from the possible phrases recognized during re-dictation. This forces the system to identify the first re-dictated phrase differently from the misrecognized text phrase. Thus, in the above example, the re-dictated phrase will be recognized as something other than "to the", preferably as "tooth". However, the re-dictated phrase, although different than the misrecognized phrase, may still be incorrect, for example "tuba", in which case the user will have to re-dictate the phrase a second time. Now, because the selected phrase is "tuba", the speech recognition system may again identify the spoken phrase as "to the". This phenomena is very frustrating to the user and can significantly decrease the recognition accuracy of the speech recognition system.

SUMMARY OF THE INVENTION

The present invention provides an improved method and system for correcting misrecognized text phrases in a computer speech recognition system by preventing prior misrecognized text from reoccurring during re-dictation.

Specifically, the present invention includes a method for correcting a user identified misrecognized text at a first location in a dictated electronic document in a computer system for speech recognition. The method includes the steps: receiving a user input in the form of a spoken utterance corresponding to an intended phrase; processing the user input to identify a plurality of alternate text selections, which are determined statistically as the most likely text recognitions corresponding to the spoken utterance; and excluding the misrecognized text from the plurality of alternate text selections and replacing the misrecognized text with a replacement text selected from the remaining alternate text selections and which is the most likely text recognition.

The misrecognized text may be stored a memory location for excluded text. Then, if the text at the location of the misrecognized text is not the intended phrase, the above steps may be repeated and additional excluded text may be stored in memory. Thus, the user may consecutively substitute the text at this location with replacement text. If the system receives a second user input identifying a second misrecognized phrase at a second location in the document, it clears the memory location containing the excluded text.

Another aspect of the present invention includes permitting the user to re-dictate a phrase previously excluded. In one embodiment, the system identifies a set of acoustic characteristics of the spoken utterance and processes the spoken utterance to determine if it has a similar set of acoustic characteristics to those of the excluded text spoken utterance. The memory location of the excluded text is cleared if the set of acoustic characteristics of the spoken utterance is substantially dissimilar from a set of acoustic characteristics for the excluded text spoken utterance. In an alternative embodiment, the excluded text stored in the memory location can be counted so as to limit the number of excluded text stored in memory to a predetermined value. The system removes the earliest stored excluded text from the memory when the number of excluded text exceeds a predetermined value. Preferably, the predetermined value is two.

Thus, the present invention provides the object and advantage of improving the process of correcting misrecognized text through re-dictation by preventing the re-recognition of text previously excluded. Further, the method and system of the present invention improves the recognition accuracy of the speech recognition engine.

An additional object and advantage of the present invention is that it affords the user the ability to re-dictate text previously changed or corrected, if desired. Previously changed text can be re-recognized when the acoustic characteristics of an additional spoken utterance and the excluded text are significantly dissimilar and/or after a prescribed quantity of excluded text has been stored in memory, i.e., after a prescribed number of re-dictations.

These and other objects, advantages and aspects of the invention will become apparent from the following description. In the description, reference is made to the accompanying drawings which form a part hereof, and in which there is shown a preferred embodiment of the invention. Such embodiment does not necessarily represent the full scope of the invention and reference is made therefore, to the claims herein for interpreting the scope of the invention.

DETAILED DESCRIPTION OF THE PREFERRED EMBODIMENT

Figure 1:
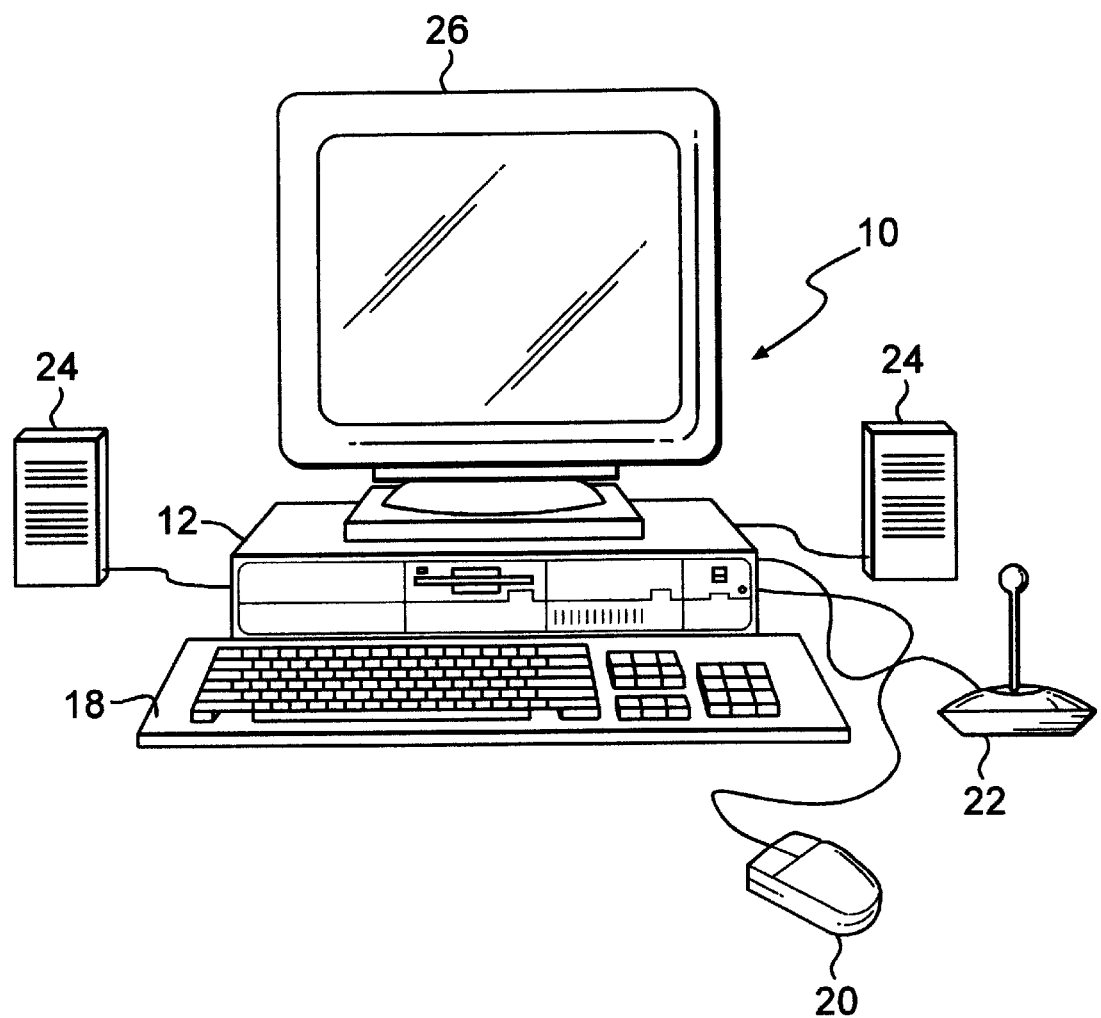
FIG. 1 shows a computer system for speech recognition with which the method and system of the present invention may be used.

Referring to the drawings, wherein like reference characters represent corresponding elements throughout the several views, more specifically referring to FIG. 1, a computer system with which the present invention may be practiced is referred to generally by reference number 10. The computer system 10 is preferably comprised of a computer 12 having a central processing unit 14 (FIG. 2), at least one memory device 16 (FIG. 2) and related electronic circuitry (not shown). The computer system 10 also includes user input devices, a keyboard 18 and a pointing device 20, a microphone 22, audio loud speakers 24, and a video display 26, all of which are operatively connected to the computer 12 via suitable interface circuitry. The keyboard 18 and loud speakers 24 may be a part of the computer system 10, but are not required for the operation of the invention.

Generally, the computer system 10, as described above, can be satisfied by any one of many high-speed multi-media personal computers commercially available from manufacturers such as International Business Machines Corporation, Compaq, Hewlett Packard, or Apple Computers. The memory devices 16 preferably include an electronic random access memory module and a bulk storage device, such as a magnetic disk drive. The central processing unit 14 may include any suitable processing chip, such as any of the Pentium family microprocessing chips commercially available from Intel Corporation.

Figure 2:
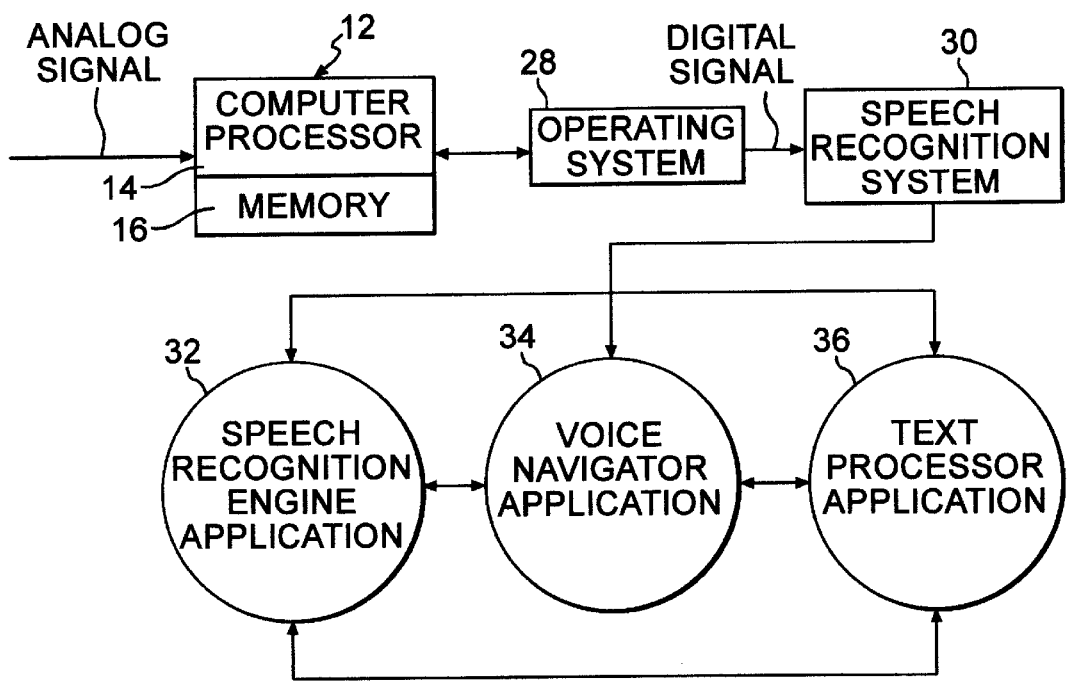
FIG. 2 is a block diagram showing a typical architecture for the computer system of FIG. 1 having a speech recognition engine.

Referring to FIG. 2, which illustrates a typical architecture for a computer system 10 adapted for speech recognition, the system includes an operating system 28 and a speech recognition system 30. The speech recognition system 30 includes a speech recognition engine application 32, a voice navigation application 34 and a speech text processor application 36. However, the invention is not limited in this regard as the voice navigation and text processor application 36 are not required to practice the invention. Moreover, the speech recognition engine application 32 can be used with any other application program that is to be voice enabled. The speech recognition engine 32, voice navigator 34 and text processor 36 are shown as separate application programs, however, they could also be implemented as a single, more complex application.

In a preferred embodiment, the operating system 28 is one of the Windows family of operating systems, such as Windows NT, Windows '95 or Windows '98, which are available from Microsoft Corporation of Redmond, Washington. The present invention is not limited in this regard, however, as it may also be used with any other type of computer operating system.

Referring still to FIG. 2, in general, an analog audio signal containing speech commands is received by the microphone 22 and processed within the computer 12 by conventional audio circuitry, having an analog to digital convertor, which produces a digitized form of the signal. The operating system 28 transfers the digital command signal to the speech recognition system 30, where the command is recognized by the speech recognition engine 32.

Figure 3:
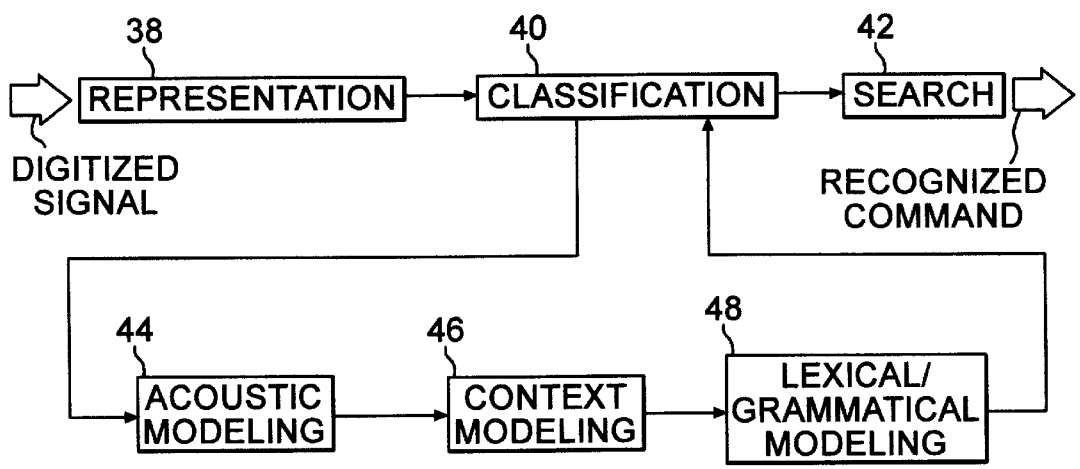
FIG. 3 is a block diagram showing the architecture for a speech recognition engine using multiple constraints in the recognition process.

Referring now to FIG. 3, the speech recognition engine 32 receives the digitized speech signal from the operating system 28. The signal is subsequently transformed in representation block 38 into a useful set of data by sampling the signal at some fixed rate, typically every 10–20 msec. The representation block produces a new representation of the audio signal which can then be used in subsequent stages of the voice recognition process to determine the probability that the portion of the waveform just analyzed corresponds to a particular phonetic event. This process is intended to emphasize perceptually important speaker independent features of the speech signals received from the operating system. In classification block 40, the processed speech command signal is used to identify, from the entire set of control commands, a subset of probable commands corresponding to the digitized speech command. This subset of probable commands is searched at block 42 to obtain the recognized command.

Referring still to FIG. 3, classification block 40 is preferably performed by acoustic modeling block 44, context modeling block 46 and lexical/grammatical modeling block 48. At acoustic modeling block 44, algorithms process the speech command signal to adapt speaker-independent acoustic models, contained in memory 16, to the acoustic signal of the current speaker and identify one or more probable matching commands.

At block 46, additional algorithms process the command signal according to the current state of the computer system as well as context events, including prior commands, system control activities, timed activities, and application activation, occurring prior to or contemporaneously with the spoken command. Specifically, these data structures include activities such as: user inputs by voice, mouse, stylus or keyboard; operation of drop-down menus or buttons; the activation of applications or applets within an application; prior commands; and idle events, i.e., when no activity is logged in an event queue for a prescribed time period. The system states and events can be analyzed, using statistical modeling techniques, to identify one or more probable commands matching the context in which the command was given.

At block 48, known algorithms conform the digitized speech command to lexical and grammatical models. These models are used to help restrict the number of possible words corresponding to a speech signal according a word's use in relation to neighboring words. The lexical model is simply a vocabulary of words understood by the system. The grammatical model, sometimes referred to as a language model, may be specified simply as a finite state network, where the permissible words following each word are explicitly listed, or may be implemented in a more sophisticated manner making use of context sensitive grammar, as is known in the art.

In its preferred embodiment, the present invention includes all three of the above-described modeling techniques. However, the invention is not limited in this regard and can be performed using more or less modeling techniques. For example, it may be practiced without the event-based context modeling step. Also, each modeling technique may be performed discretely from, or interdependently with, the other models.

Figure 4:
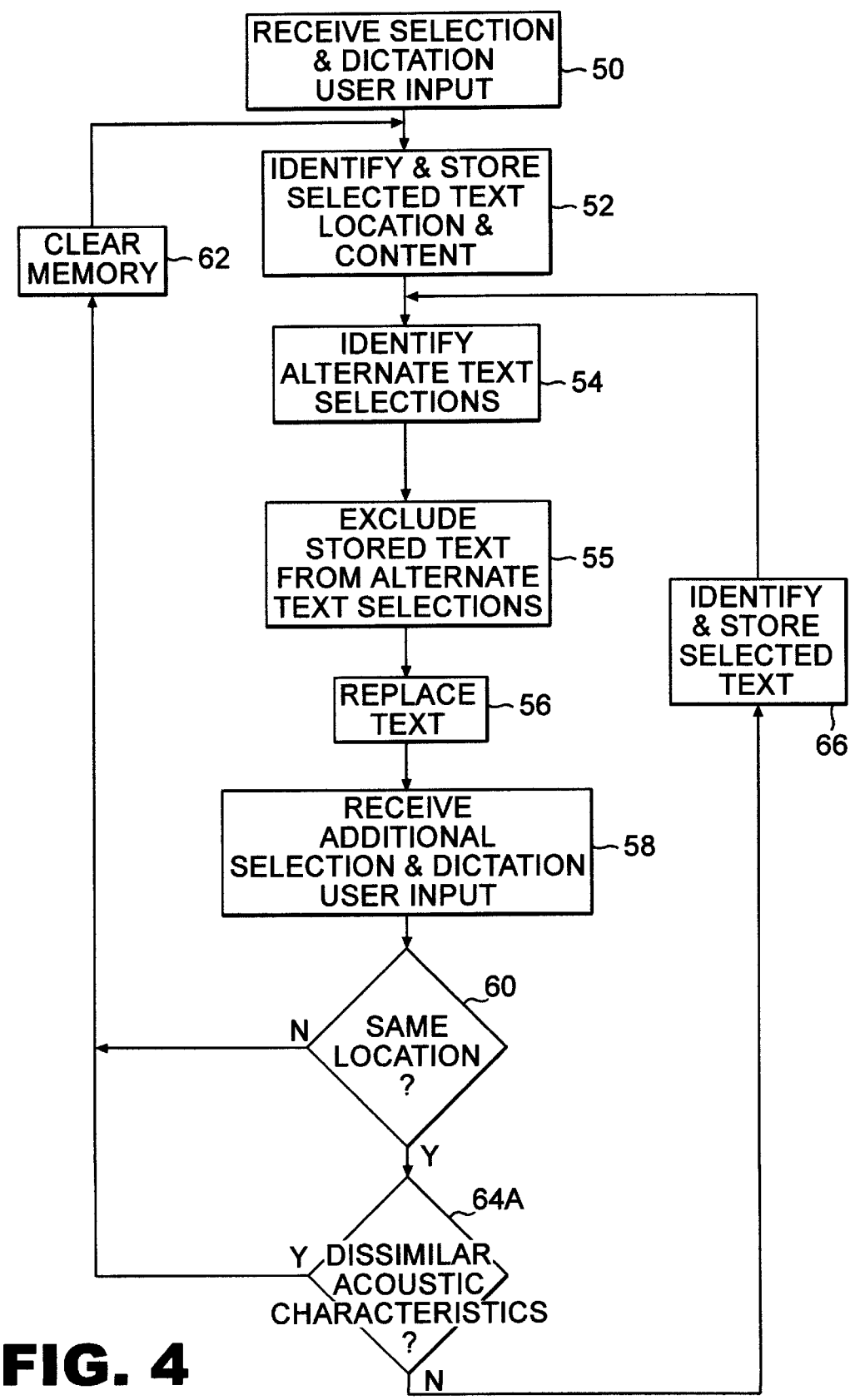
FIG. 4 is a flow chart illustrating a first embodiment of the method and system for excluding unintended phrases during re-dictation.

Referring now to FIG. 4, and particularly to step 50, once the system has received and recognized user dictation in a document in a suitable computer software application, such as a word processor, the user may select the location of individual misrecognized text phrases. The user may select the phrases one at a time in any suitable manner, such as with the keyboard 18, the pointing device 20 or a stylus (not shown). Once selected, the user issues a spoken utterance re-dictating the intended phrase. At step 52, the system identifies the location of the selected misrecognized text and stores its content and location in a suitable place in the memory 16 for text excluded from replacing the misrecognized text.

Then, at step 54, the system processes the re-dictated spoken utterance of the user and identifies one or more alternate text selections. Using the speech recognition engine and statistical modeling techniques described above, the identified alternates are the most likely text corresponding to the re-dictated utterance of the user. At step 55, the system excludes the misrecognized text from the alternates. If the speech recognition engine 32 recognizes the re-dictated word as intended by the user, excluding the selected misrecognized text is of no consequence. However, if the system recognizes the re-dictated word as being the misrecognized text, it is precluded from using it to replace the selected misrecognized text. Thus, the speech recognition engine cannot repeatedly recognize a spoken utterance as the same unintended phrase.

At step 56, the system substitutes the misrecognized text with a replacement text. An algorithm is executed to select the replacement text from the remaining alternates. The replacement text is the alternate statistically determined to be the most likely text recognition, or in other words, the remaining alternate that most closely corresponds to the spoken utterance.

Still referring to FIG. 4, the process continues to step 58 in which the system accepts additional selection and dictation input from the user for additional corrections. If no additional corrections to the same text, or other dictated text phrases, are needed, the process ends. Otherwise, step 58 permits the process to be repeatedly performed when the replacement text is misrecognized or unintended text.

At step 60, the system compares the location of the text selected in step 58 to that of the misrecognized text stored in memory. If the user input now identifies a misrecognized text at a second, different location in the document, the process advances to step 62 where the content and location of the misrecognized phrase are cleared from memory. At this point, the process returns to step 52 where the content and location of the newly selected phrase are stored in the memory. The process then repeats the steps described above.

Otherwise, the user input received at step 58 identifies the replacement text at the same location and includes another spoken utterance re-dictating the intended phrase. Typically, this occurs when the first re-dictation did not correct the misrecognized text as intended. However, it is also possible that the intended phrase was correctly recognized, but the user chooses to replace it with a different phrase. In this case, the user would be dictating a new spoken utterance, rather than re-dictating the same intended phrase.

In either case, in one embodiment of the present invention shown in FIG. 4, the process continues to step 64A where the system identifies a set of acoustic characteristics, such as pronunciation and inflection, for the new spoken utterance. The system then executes an algorithm to process the set of acoustic characteristics and determine whether they are similar to a set of acoustic characteristics for the spoken utterance of the excluded misrecognized text.

If the acoustic properties of the two phrases are significantly dissimilar, the system assumes the user is changing the text, rather than correcting it. In this case, the process advances to step 62 where the system clears the misrecognized text from memory. Thus, step 64A permits the user to change the selected phrase back to the misrecognized text.

If the acoustic characteristics of the re-dictated spoken utterance and the excluded misrecognized text are not significantly different, the system assumes the user is attempting to correct the text, rather than simply change it. In this case, the process continues to step 66 where the replacement text is stored in the memory location for excluded text (along with the original misrecognized phrase), and then the process returns to step 54 where the system identifies alternate text selections and a new most likely replacement text, other than the excluded text. The process described above continues until the spoken utterance is correctly recognized and/or the user selects another phrase.

As an example, assume the user originally dictates the sentence, "Go to the store and by some milk". Further assume, however, that the phrase "store" was misrecognized as "stone" by the speech recognition engine 32. The user can correct this error by selecting "stone" and re-dictating "store" (step 50). If the system correctly recognizes the phrase, "store" is substituted for "stone" in the sentence. However, if the system misrecognizes the re-dictation, for example as "stove", the incorrect phrase "stove" replaces "stone". Alternatively, if the system recognizes the re-dictation again as "stone", which is excluded text (step 55), it inserts the next best replacement text (step 56). If this is still incorrect, the user can select and re-dictate phrases (step 58) repeatedly until it is correctly recognized as "store". Then, the user can select another text phrase to be corrected in the same manner, and after comparing the location of the new text (step 60) with that of the original misrecognized text stored in memory (step 52), the system clears the excluded text from memory (step 62).

Now assume that another user originally dictated the word "dog", and then simply changed it to "cat" by re-dictation as described above. Assume further that the user wishes to change it back to "dog". Since "dog" was the originally selected word, it is excluded from being a replacement for "cat". However, because the acoustic characteristics of "cat" and "dog" are significantly different (step 64A), the excluded phrases are cleared from memory and "dog" can then be identified as a replacement text.

Figure 5:
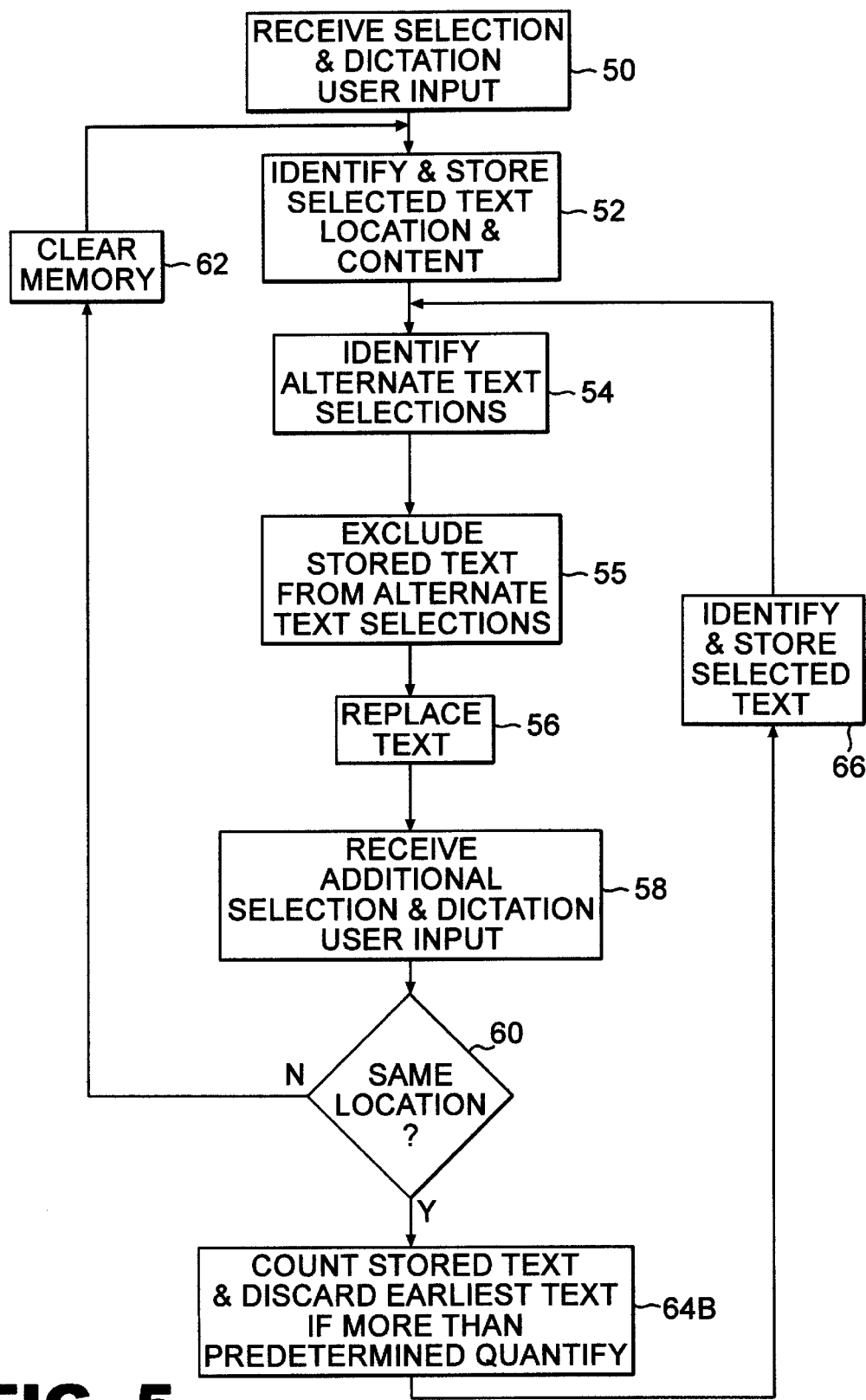
FIG. 5 is a flow chart illustrating a second embodiment of the method and system for excluding unintended phrases during re-dictation.

Referring to FIG. 5, in another embodiment of the invention, the system includes the same steps as described in process steps 50–62 above. However, this embodiment replaces step 64A with step 64B, so that rather than analyzing the acoustic characteristics of the re-dictated spoken utterance, a system counter tallies the number of excluded text stored in memory and limits this number to a predetermined quantity. For instance, the number of stored excluded text phrases could be limited to two. And, the stored excluded text is discarded on a first-in-first-out basis, so that each additional excluded text replaces the earliest text in memory. The process then continues to step 66 where the replacement text is stored in the memory location for excluded text, after which it returns to step 54 where the system identifies alternate text selections excluding only the stored text.

For example, the system of this embodiment would recognize a third spoken utterance differently from the originally misrecognized text and the replacement text. And, a fourth utterance would be recognized differently from the first replacement text and the second replacement text, but not necessarily the original text. Thus, the user in the above example could dictate "dog" and change it to "cat". Both "dog" and "cat" would be excluded for the next re-dictation, but after that the user could re-dictate "dog", since "dog" is no longer excluded text.

While the foregoing description illustrates and describes the preferred embodiments of the invention, it is to be understood that the invention is not limited to the precise construction herein disclosed. The invention can be embodied in other specific forms without departing from the spirit or essential attributes of the invention. Therefore, in order to apprise the public of the scope of the invention, the following claims are made.

We claim:

1. In a computer system for speech recognition, a method for correcting a user identified misrecognized text having a first location in a dictated electronic document comprising the steps of:
   (a) receiving a user input in the form of a spoken utterance corresponding to an intended phrase;
   (b) processing said user input to identify a plurality of alternate text selections which are determined statistically as the most likely text recognitions corresponding to said spoken utterance;
   (c) excluding said misrecognized text from said plurality of alternate text selections and replacing said misrecognized text with a replacement text selected from the remaining alternate text selections and which is the most likely text recognition;
   (d) storing said misrecognized text and a location of said misrecognized text in a memory location for excluded text; and
   (e) repeating steps (a)–(d) when said replacement text is misrecognized text, thereby excluding subsequent ones of said misrecognized text from said alternate text selections.

2. The method of claim 1, further comprising the steps of:
   receiving a second user input identifying a second misrecognized text at a second location in said document; and,
   clearing said memory location for excluded text.

3. The method of claim 1, further comprising the steps of:
   identifying a set of acoustic characteristics of said spoken utterance;
   processing said spoken utterance to determine if it has a similar set of acoustic characteristics to those of said excluded text spoken utterance; and
   clearing said excluded text from said memory location if said set of acoustic characteristics of said spoken utterance are substantially dissimilar from a set of acoustic characteristics for said excluded text spoken utterance.

4. The method of claim 1, further comprising the steps of:
   counting each excluded text stored in said memory location; and
   removing the earliest stored excluded text from said memory location when a number of excluded text exceeds a predetermined value.

5. The method of claim 4, wherein said predetermined value is two.

6. A computer speech recognition system for correcting a user identified misrecognized text having a first location in a dictated electronic document, comprising:
   input means for receiving a user input in the form of a spoken utterance corresponding to an intended phrase;
   processor means for processing said user input to identify a plurality of alternate text selections which are determined statistically as the most likely text recognitions corresponding to said spoken utterance;
   wherein said processing means excludes said misrecognized text from said plurality of alternate text selections and replaces said misrecognized text with a replacement text selected from the remaining alternate text selections and which is the most likely text recognition; and
   memory means for storing said misrecognized text, a location of said misrecognized text, and subsequent misrecognized text at said location for excluding subsequent ones of said misrecognized text from said alternate text selections in a memory location for excluded text.

7. The system of claim 6, wherein a second user input identifying a second misrecognized phrase at a second location in said document is received by said input means and said memory location for excluded text is cleared.

8. The system of claim 6, further comprising:
   identification means for identifying a set of acoustic characteristics of said spoken utterance;
   wherein said processor means processes said spoken utterance to determine if it has a similar set of acoustic characteristics to those of said excluded text spoken utterance, and said excluded text is cleared from said memory location if said set of acoustic characteristics of said spoken utterance are substantially dissimilar from a set of acoustic characteristics for said excluded text spoken utterance.

9. The system of claim 6, further comprising a counting means for counting each excluded text stored in said memory location, wherein said earliest stored excluded text is removed from said memory location when a number of excluded text exceeds a predetermined value.

10. The system of claim 9, wherein said predetermined value is two.

11. A machine readable storage, having stored thereon a computer program having a plurality of code sections executable by a machine for causing the machine to correct a user identified misrecognized text having a first location in a dictated electronic document and perform the steps of:

(a) receiving a user input in the form of a spoken utterance corresponding to an intended phrase;

(b) processing said user input to identify a plurality of alternate text selections which are determined statistically as the most likely text recognitions corresponding to said spoken utterance;

(c) excluding said misrecognized text from said plurality of alternate text selections and replacing said misrecognized text with a replacement text selected from the remaining alternate text selection and which is the most likely text recognition;

(d) storing said misrecognized text and a location of said misrecognized text in a memory location for excluded text; and (e) repeating steps (a)–(d) when said replacement text is misrecognized text, thereby excluding subsequent ones of said misrecognized text from said alternate text selections.

* * * * *